United States Patent
Mader et al.

(10) Patent No.: US 9,312,732 B2
(45) Date of Patent: Apr. 12, 2016

(54) ROTOR WITH PERMANENT EXCITATION HAVING PERMANENT MAGNETS AND FLUX CONDUCTING ELEMENTS THEREBETWEEN, ELECTRIC MACHINE HAVING SUCH A ROTOR AND MANUFACTURING METHOD FOR THE ROTOR

(71) Applicant: Siemens Aktiengesellschaft, München (DE)

(72) Inventors: Daniel Mader, Bad Neustadt a. d. Saale (DE); Rolf Vollmer, Gersfeld (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 382 days.

(21) Appl. No.: 13/832,732

(22) Filed: Mar. 15, 2013

(65) Prior Publication Data

US 2013/0241324 A1 Sep. 19, 2013

(30) Foreign Application Priority Data

Mar. 16, 2012 (EP) ................................. 12159915

(51) Int. Cl.
*H02K 1/27* (2006.01)
*H02K 1/28* (2006.01)
*H02K 15/03* (2006.01)

(52) U.S. Cl.
CPC ............. *H02K 1/2773* (2013.01); *H02K 1/28* (2013.01); *Y02T 10/641* (2013.01)

(58) Field of Classification Search
CPC ............ H02K 1/27; H02K 1/28; H02K 15/03

USPC ............ 310/156.08, 156.21, 156.22, 156.19, 310/156.31, 156.55, 156.56, 156.61

See application file for complete search history.

(56) References Cited

U.S. PATENT DOCUMENTS

| | | | |
|---|---|---|---|
| 5,066,880 A | * | 11/1991 | Banon ...................... 310/156.55 |
| 6,483,221 B1 | | 11/2002 | Pawellek et al. |
| 6,628,031 B2 | | 9/2003 | Vollmer |
| 6,768,238 B2 | | 7/2004 | Knauff et al. |
| 6,812,612 B2 | | 11/2004 | Schunk et al. |

(Continued)

FOREIGN PATENT DOCUMENTS

| | | | |
|---|---|---|---|
| FR | 2 556 519 A1 | 6/1985 | |
| FR | 2556519 A | * 6/1985 | ............... H02K 1/28 |

(Continued)

OTHER PUBLICATIONS

Machine translation of FR 2556519 A (Jun. 1985).*

*Primary Examiner* — Michael Andrews
(74) *Attorney, Agent, or Firm* — Henry M. Feiereisen LLC

(57) ABSTRACT

A rotor includes a shaft and a plurality of permanent magnets which are arranged around the shaft in a circumferential direction for permanent excitation. At least one of the permanent magnets is attached to the shaft by a material joint or formfit. A flux conducting device for conducting a magnetic flux of the permanent magnets has a plurality of separate soft-magnetic flux conducting elements, with each flux conducting element being mounted between two of the permanent magnets and fixed thereto so as to be indirectly held in place on the shaft. At least one of the flux conducting elements has at least one contact area sized to cover an outer edge of one of the permanent magnets in the radial direction.

20 Claims, 4 Drawing Sheets

(56) References Cited

U.S. PATENT DOCUMENTS

| | | | |
|---|---|---|---|
| 6,858,965 B2 | 2/2005 | Mueller et al. |
| 6,885,187 B2 | 4/2005 | Duenisch et al. |
| 6,943,467 B2 | 9/2005 | Potoradi et al. |
| 7,141,905 B2 | 11/2006 | Vollmer |
| 7,285,883 B2 | 10/2007 | Bott et al. |
| 7,564,158 B2 | 7/2009 | Huth et al. |
| 7,705,507 B2 | 4/2010 | Vollmer |
| 7,709,984 B2 | 5/2010 | Braun et al. |
| 7,732,967 B2 | 6/2010 | Schunk et al. |
| 7,755,315 B2 | 7/2010 | Bott et al. |
| 7,777,373 B2 | 8/2010 | Bott et al. |
| 7,859,160 B2 | 12/2010 | Vollmer |
| 7,915,777 B2 | 3/2011 | Vollmer |
| 7,977,826 B2 | 7/2011 | Vollmer et al. |
| 8,026,640 B2 | 9/2011 | Bott et al. |
| 8,035,371 B2 | 10/2011 | Budde et al. |
| 8,063,517 B2 | 11/2011 | Bott et al. |
| 8,115,360 B2 | 2/2012 | Vollmer |
| 8,134,273 B2 | 3/2012 | Vollmer et al. |
| 8,227,951 B2 | 7/2012 | Grossmann et al. |
| 8,283,815 B2 | 10/2012 | Vollmer |
| 8,378,541 B2 | 2/2013 | Vollmer |
| 2003/0011267 A1 | 1/2003 | Vollmer |
| 2003/0094940 A1 | 5/2003 | Duenisch et al. |
| 2003/0173853 A1 | 9/2003 | Knauff et al. |
| 2004/0075359 A1 | 4/2004 | Mueller et al. |
| 2004/0084989 A1 | 5/2004 | Schunk et al. |
| 2004/0095033 A1* | 5/2004 | Popov ..................... 310/156.55 |
| 2004/0155539 A1 | 8/2004 | Potoradi et al. |
| 2004/0261553 A1 | 12/2004 | Bott et al. |
| 2005/0231060 A1 | 10/2005 | Vollmer |
| 2006/0131976 A1* | 6/2006 | Kikuchi et al. .......... 310/156.46 |
| 2006/0219880 A1 | 10/2006 | Braun et al. |
| 2007/0035193 A1 | 2/2007 | Huth et al. |
| 2007/0040466 A1 | 2/2007 | Vollmer |
| 2007/0114861 A1 | 5/2007 | Bott et al. |
| 2007/0257566 A1 | 11/2007 | Vollmer |
| 2007/0257575 A1 | 11/2007 | Vollmer |
| 2007/0267930 A1* | 11/2007 | Ogava ..................... 310/156.53 |
| 2008/0073985 A1 | 3/2008 | Bott et al. |
| 2008/0164777 A1 | 7/2008 | Braun et al. |
| 2008/0169718 A1 | 7/2008 | Bott et al. |
| 2008/0185931 A1 | 8/2008 | Platen et al. |
| 2008/0197741 A1 | 8/2008 | Schunk et al. |
| 2008/0197742 A1 | 8/2008 | Vollmer |
| 2008/0289440 A1 | 11/2008 | Denk et al. |
| 2008/0315704 A1 | 12/2008 | Vollmer |
| 2009/0009114 A1 | 1/2009 | Schunk et al. |
| 2009/0015080 A1 | 1/2009 | Vollmer et al. |
| 2009/0039713 A1 | 2/2009 | Bott et al. |
| 2009/0072634 A1 | 3/2009 | Vollmer |
| 2009/0152959 A1 | 6/2009 | Vollmer |
| 2009/0152976 A1 | 6/2009 | Bott et al. |
| 2009/0160283 A1 | 6/2009 | Bott et al. |
| 2009/0184602 A1 | 7/2009 | Braun et al. |
| 2009/0206686 A1 | 8/2009 | Vollmer |
| 2009/0212644 A1 | 8/2009 | Bott et al. |
| 2009/0218904 A1 | 9/2009 | Vollmer |
| 2009/0251013 A1 | 10/2009 | Vollmer et al. |
| 2009/0295236 A1 | 12/2009 | Bott et al. |
| 2009/0295251 A1 | 12/2009 | Vollmer et al. |
| 2009/0302832 A1 | 12/2009 | Budde et al. |
| 2009/0315424 A1 | 12/2009 | Vollmer |
| 2009/0322174 A1 | 12/2009 | Grossmann et al. |
| 2010/0000830 A1 | 1/2010 | Budde et al. |
| 2010/0013332 A1 | 1/2010 | Vollmer |
| 2010/0013333 A1 | 1/2010 | Vollmer |
| 2010/0013341 A1 | 1/2010 | Vollmer |
| 2010/0052466 A1 | 3/2010 | Vollmer et al. |
| 2010/0072850 A1* | 3/2010 | Miyata et al. ............ 310/156.12 |
| 2010/0133940 A1 | 6/2010 | Grossmann et al. |
| 2010/0264770 A1 | 10/2010 | Braun et al. |
| 2010/0277028 A1* | 11/2010 | Alexander et al. ....... 310/156.51 |
| 2011/0006617 A1 | 1/2011 | Budde et al. |
| 2012/0025654 A1 | 2/2012 | Bach et al. |
| 2012/0038228 A1 | 2/2012 | Vollmer |

FOREIGN PATENT DOCUMENTS

| | | |
|---|---|---|
| JP | 56007410 A | 1/1981 |
| JP | 58099253 A | 6/1983 |
| WO | WO 2011/076740 A1 | 6/2011 |

* cited by examiner

ROTOR WITH PERMANENT EXCITATION HAVING PERMANENT MAGNETS AND FLUX CONDUCTING ELEMENTS THEREBETWEEN, ELECTRIC MACHINE HAVING SUCH A ROTOR AND MANUFACTURING METHOD FOR THE ROTOR

CROSS-REFERENCES TO RELATED APPLICATIONS

This application claims the priority of European Patent Application, Serial No. 12159915, filed Mar. 18, 2013, pursuant to 35 U.S.C. 119(a)-(d), the content of which is incorporated herein by reference in its entirety as if fully set forth herein.

BACKGROUND OF THE INVENTION

The present invention relates to a rotor with permanent excitation, and to an electric machine having such a rotor, and to a manufacturing method for the rotor.

The following discussion of related art is provided to assist the reader in understanding the advantages of the invention, and is not to be construed as an admission that this related art is prior art to this invention.

Rotors can be provided to form a soft-magnetic base body composed of laminated metal sheets as the flux conducting device. The laminated metal sheets are stacked up in layers to form a laminated core, with an electrically insulating layer being provided between the individual sheets in order to avoid eddy currents. A hole is punched out in the center of the individual sheets so that following its completion the laminated core will have a passage aperture through which the shaft of the rotor is inserted. The laminated core can thus be joined to the shaft by means of an interference fit. Furthermore, cutouts are also punched out on the outer edge of the laminated sheets such that pockets are produced in the finished laminated core in the circumferential direction, into which pockets permanent magnets for producing a permanent excitation of the rotor can be embedded. The term "circumferential direction" has hereby its usual meaning, i.e. in relation to an axis of rotation of the rotor, the circumferential direction is established in a plane perpendicular to the axis of rotation of the rotor, which corresponds to the direction in which a circle runs around the axis of rotation in this plane.

It would be desirable and advantageous to provide an improved rotor with permanent excitation, improved electric machine having such a rotor, and improved method for manufacturing a rotor to obviate prior art shortcomings.

SUMMARY OF THE INVENTION

According to one aspect of the present invention, a rotor includes a shaft, a plurality of permanent magnets arranged around the shaft in a circumferential direction for permanent excitation, at least one of the permanent magnets being attached to the shaft by a material joint or formfit, and a flux conducting device for conducting a magnetic flux of the permanent magnets, the flux conducting device having a plurality of separate soft-magnetic flux conducting elements, with each flux conducting element being mounted between two of the permanent magnets and fixed thereto so as to be indirectly held in place on the shaft, at least one of the flux conducting elements having at least one contact area sized to cover an outer edge of one of the permanent magnets in the radial direction.

The present invention resolves prior art problems by mounting the permanent magnets on the shaft itself, i.e. they are not accommodated in pockets of a soft-magnetic laminated core. For example, the permanent magnets are secured to the shaft by an adhesive bond. A flux conducting device is provided to conduct the magnetic flux of the permanent magnets. The flux conducting device includes a plurality of separate soft-magnetic flux conducting elements, for instance individual laminated cores, each of which forming a segment of the rotor. The individual flux conducting elements are each mounted between two of the permanent magnets and secured thereto. Thus, the soft-magnetic flux conducting elements are held in place only indirectly on the shaft and not secured on the shaft by an interference fit for example.

A rotor according to the invention has the advantage that it can be assembled very easily around the shaft by first fixing the permanent magnets to the rotor shaft, subsequently arranging the flux conducting elements in the spaces between the permanent magnets and then attaching them to the permanent magnets.

According to another advantageous feature of the present invention, the at least one of the permanent magnets may be attached to the shaft by soldering or welding. When the material joint is a soldered joint, a solder containing silver and/or tin can be used. A soldered joint is on the one hand strong enough to hold the permanent magnets securely on the shaft against the centrifugal forces acting during a rotation of the rotor. On the other hand the solder of the soldered joint is soft enough not to break in the event of vibrations in the rotor. A further possibility of attaching the permanent magnets to the shaft is a welded joint. In this case, however, it is important to take into account that the magnetization of the permanent magnets is not lost due to the heat during the welding operation. There is considerably less risk of this in the case of a soldered joint. Possible examples of formfitting connections are fixing the permanent magnets by means of a screwed connection or forming a dovetail joint.

In order to obtain an even more regular, sinusoidal curve for a flux conducting element, a step or undercut can be provided by which the flux conducting element bears on an outside edge of a permanent magnet such that the outside edge is covered by the step of the flux conducting element. The term "outside edge" relates in this context to an edge of the permanent magnet located on the outside in the radial direction. A flux conducting element can furthermore be aligned particularly easily with respect to the mentioned enveloping circle by a step in the flux conducting element.

Accordingly, a permanently excited electric machine can also be provided at particularly low cost on the basis of the rotor according to the invention. The rotor according to the invention is particularly suitable for producing a synchronous machine, a servomotor and a stepper motor.

The term "shaft" within the context of the invention denotes the entire internal region of the rotor which does not form in any significant way a magnetically active part for generating a torque for driving the rotor or for generating electrical voltage. In other words, the shaft is that part of the rotor which has only a supporting function and serves for mechanically transmitting a torque. In contrast thereto, the magnetically active part is formed by the permanent magnets and the flux conducting elements. The shaft can therefore be a bar made of steel for example or else also a hollow cylindrical body (hollow shaft). In order to increase the size of an outer circumference of the rotor in the region of the permanent magnets, the shaft can have e.g. spokes and, supported by the spokes, a ring to which the permanent magnets are then attached.

According to another advantageous feature of the present invention, at least one of the permanent magnets may have a metal coating in a contact area on the shaft in order to facilitate producing the connection, in particular a soldered or welded joint. Likewise, the shaft can have a coating in the contact area that is made of a different metal from the metal of which the shaft itself is made. A coating including nickel or copper has proved particularly beneficial for a soldered joint in this case.

In the contact area, the shaft and the permanent magnets beneficially also correspond to each other in terms of their shape. Depending on the size and type of the permanent magnets, it can be provided that a permanent magnet has a concavely curved surface. Then it is possible to use a normal cylindrical shaft which does not have to be specially adapted in its shape in order to provide the rotor according to the invention. If, however, it is more cost-effective to embody the shaft specifically and accordingly to be able to use cuboidal and therefore easy-to-shape permanent magnets, then a shaft is preferred whose surface is flat in the contact area of the permanent magnet. This enables easy-to-shape permanent magnets to be used, which can therefore be manufactured at reasonable cost. In other words a shaft having a polygonal contour in cross-section is used if all of the permanent magnets in the contact area have a planar surface.

According to another advantageous feature of the present invention, at least one of the flux conducting elements can be adhesively bonded to at least one permanent magnet. This is particularly cost-effective to manufacture results. Advantageously, the adhesive bond may include a silicone adhesive. Like the soldered joint for the permanent magnets, this has the necessary strength for holding the flux conducting elements secure against the centrifugal forces on the one hand, and on the other hand has sufficient elasticity for compensating or even damping vibrations in the rotor.

According to another advantageous feature of the present invention, the rotor has perpendicular to its axis of rotation a cross-section in which the permanent magnets can be arranged in a star shape on the shaft, and the flux conducting elements can be arranged in a wedge shape, i.e. cylinder segments, between the permanent magnets. The thus resulting rotor is very robust and nonetheless particularly easy to manufacture.

With regard to the permanent magnets themselves, these can be rare earth magnets for example. Currently preferred are ferrite magnets as permanent magnets since they are significantly cheaper than rare earth magnets, even though ferrite magnets have a lower magnetic field strength. However, that is not a problem because the magnetic field of ferrite magnets can be concentrated to such an extent that a magnetic field having the field strength that is usual for permanently excited electric machines can be generated in an air gap between the rotor and a stator of an electric machine. For that purpose, the magnetizations of the permanent magnets should simply point in the circumferential direction, i.e. not radially away from the shaft, but tangentially to the circumference of the shaft. The flux conducting elements located between the permanent magnets ensure that the magnetic field lines are diverted outward in the radial direction and emerge radially from the rotor on its outer circumference. As a result of the diversion, a flux concentration is established such that the field of the ferrite magnets is stronger concentrated in the air gap than at the surface of the ferrite magnets themselves. Rare earth magnets can of course also be used in this case, enabling an even stronger magnetic field to be generated.

An even greater flux concentration can be achieved when the magnetizations of two adjacent permanent magnets are aligned in opposite directions to each other.

An additional aim in electric machines is also to generate in the air gap between rotor and stator a magnetic field whose field strength (not direction) extends sinusoidally around the rotor in the circumferential direction. This can be achieved in the case of the rotor according to the invention by a particular configuration of the outer surface of the flux conducting elements, i.e. this surface of each flux conducting element which bounds the latter (in relation to the shaft) in the radial direction outward toward the rotor exterior. The surface advantageously has a curvature in the circumferential direction of the rotor with a curvature radius which is smaller than a radius of an enveloping circle which describes the maximum outer circumference of the rotor in the circumferential direction. Advantageously, the curvature radius may range between 50 and 100 percent of the enveloping circle radius.

The refinement described in connection with the rotor according to the invention also constitutes refinements of the electric machine.

According to another aspect of the present invention, a method for manufacturing a rotor includes attaching permanent magnets to a shaft by a material joint or formfit, inserting flux conducting elements in spaces between the permanent magnets such that external surfaces of all the flux conducting elements are tangentially touched by an enveloping circle and steps of the flux conducting elements bear on contact edges of the permanent magnets, with the contact edge of each of the permanent magnets being formed by an edge of the permanent magnet pointing to an outside face of the rotor, and securing the flux conducting elements to the permanent magnets.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
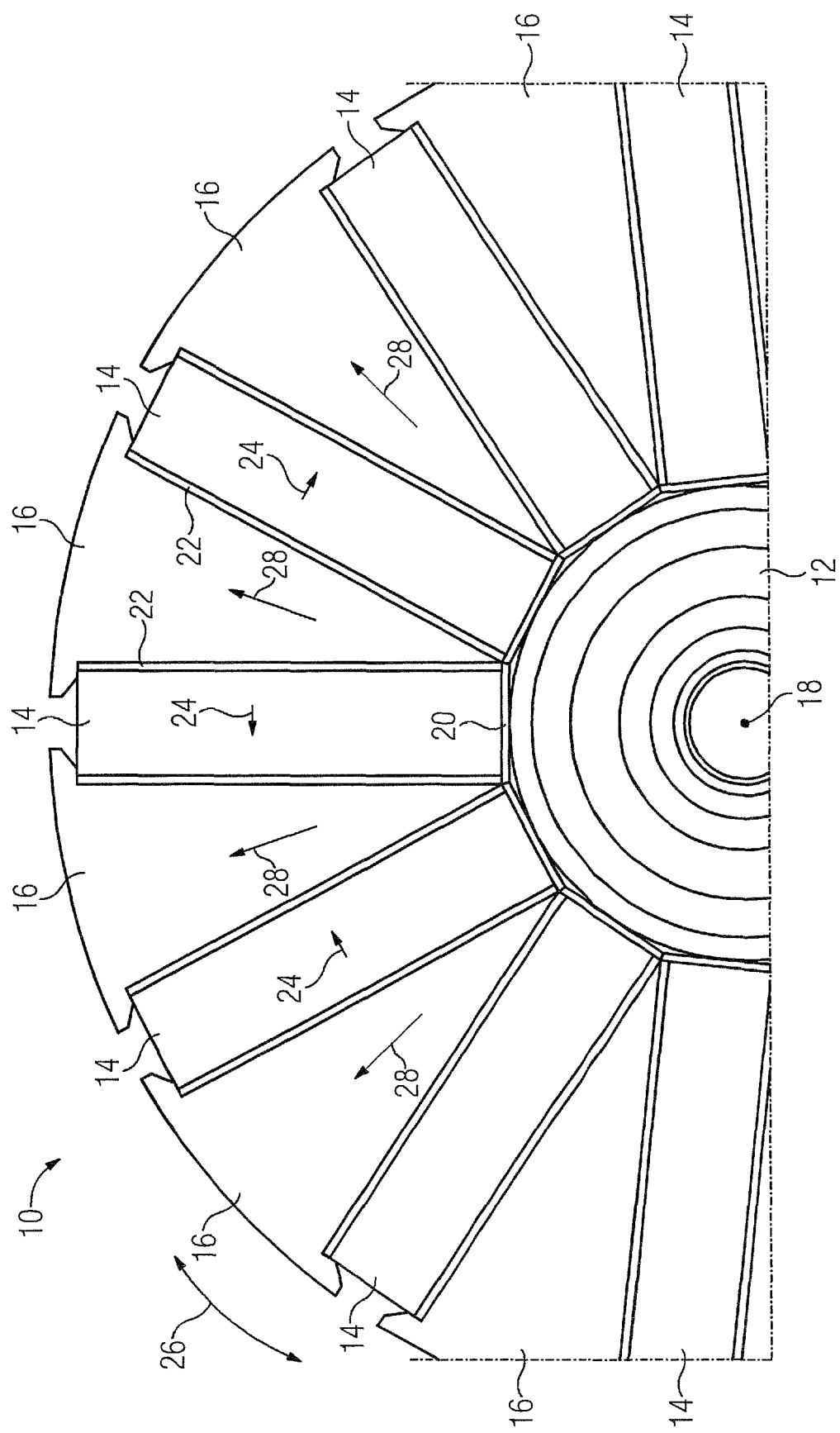
FIG. 1 is a schematic cross-sectional view of one embodiment of a rotor according to the invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a cross-section of a rotor according to the invention, generally designated by reference numeral 10 and having permanent magnets 14 attached to a shaft 12 with flux conducting elements 16 inserted between them in each case. Only a section of the rotor 10 is shown in FIG. 1, as indicated by broken lines. The rotor 10 can be installed in an electric machine, for example a synchronous machine or a servomotor. The electric machine can for example be a drive for an electric vehicle.

An axis of rotation 18 of the rotor 10 extends perpendicularly to the image plane of FIG. 1. The rotor 10 has a cylindrical basic shape overall, the cylinder axis coinciding with the rotor axis 18. In the example shown, the shaft 12 can be formed from a solid body made of steel. The permanent magnets 14 can have an elongate, cuboidal basic shape, the longitudinal dimension extending parallel to the axis of rotation 18. The flux conducting elements 16 likewise are elongate bodies, each having the basic shape of a cylinder segment, bodies likewise being aligned with their longitudinal direction extending parallel to the axis of rotation 18. All in all, the permanent magnets 14 in the cross-section shown in FIG. 1 formed perpendicularly to the axis of rotation 18 are arranged in a star shape on the shaft 12. The flux conducting elements 16 have a wedge shape in cross-section and are arranged between the permanent magnets 14.

The permanent magnets 14 can be ceramic magnets, ferrite magnets for example. The permanent magnets 14 are each attached to the shaft 12 by a soldered joint 20. For clarity of illustration reasons, the position of the soldered joint 20 is shown for only one of the permanent magnets 14 in FIG. 1. With the permanent magnets 14, a respective magnetization 24 points along a circumferential direction 26 (the circumferential direction 26 being indicated here by a double arrow, because in this case the orientation is irrelevant). The magnetic field generated by the permanent magnets 14 is in this case redirected outward in a radial direction 28 by means of the flux conducting elements 16 and concentrated in the process.

For this purpose the flux conducting elements 16 are produced from a soft-magnetic material. They can each be formed for example by means of a laminated core. The flux conducting elements 16 are not mounted directly on the shaft 12. Each flux conducting element 16 is fixed in place by means of an adhesive bond 22 on those permanent magnets 14 between which it is located. In the case of the adhesive bonds 22, too, only the adhesive bonds 22 for one flux conducting element 16 are labeled with a reference sign in FIG. 1 for clarity of illustration reasons.

In the following it is explained with reference to FIG. 2 how a rotor, the rotor 10 of FIG. 1 for example, can be manufactured. To make navigating the drawings easier, the same reference sign as in FIG. 1 is used in each case in FIG. 2 and also in the following figures for elements corresponding to elements from FIG. 1.

Figure 2:
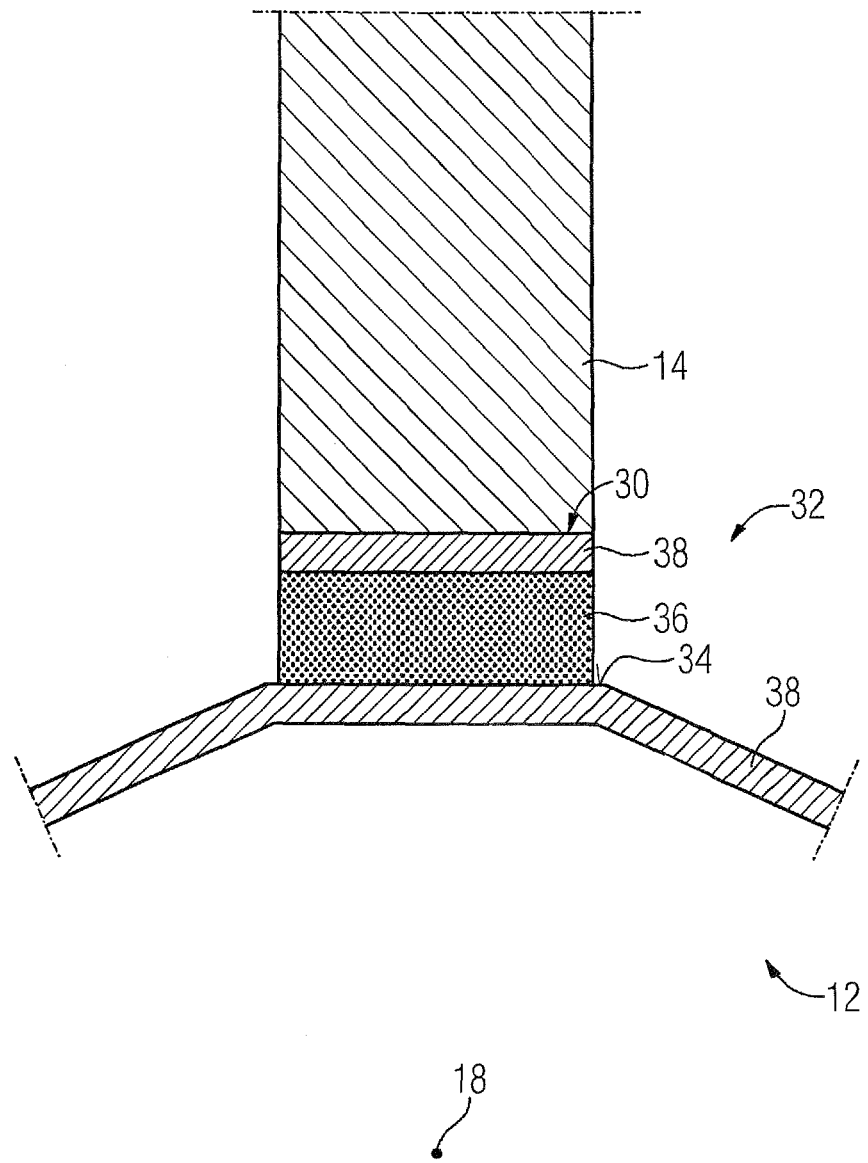
FIG. 2 is a schematic view of a connection of a permanent magnet to a shaft, as produced during the manufacture of a rotor according to the invention.

FIG. 2 shows once more in a magnified view a shaft 12 to which a permanent magnet 14 has been attached. The permanent magnet 14 has a cuboidal basic shape such that a surface 30 of the permanent magnet 14 in a contact area 32 of the permanent magnet 14 on the shaft 12 is flat. A surface 34 of the shaft 12 is shaped correspondingly in the contact area 32, which is to say that it too is flat. Overall, therefore, the shaft 12 has a polygon shape in a cross-section perpendicular to the axis of rotation 18 if the contact surfaces of all of the permanent magnets 14 are flat. Alternatively thereto, the shaft 12 can also be round if the permanent magnets 14 have a correspondingly round contour on the side facing toward the shaft 12, that is to say if they are each curved concavely there toward the inside of the permanent magnets 14.

In order to attach the permanent magnet 14 to the shaft 12, a solder 36, e.g. in the form of a solder paste, was applied and heated. The solder 36 can be for example a soft solder, for example a solder including silver or tin. In order to obtain a strong, material-to-material bond by means of the solder 36, in the example shown in FIG. 2 both the permanent magnet 14 and the shaft 12 are coated with a layer 38, in particular a metal layer, such as a layer composed of nickel and/or copper for example.

After the permanent magnet 14 and further permanent magnets (compare FIG. 1) are mounted on the shaft 12 in the manner shown in FIG. 2, flux conducting elements 16, in other words for example sheet-metal segments, are inserted between the permanent magnets 14 and fixed to the permanent magnets 14 e.g. by means of an adhesive, for example a silicone glue.

Figure 3:
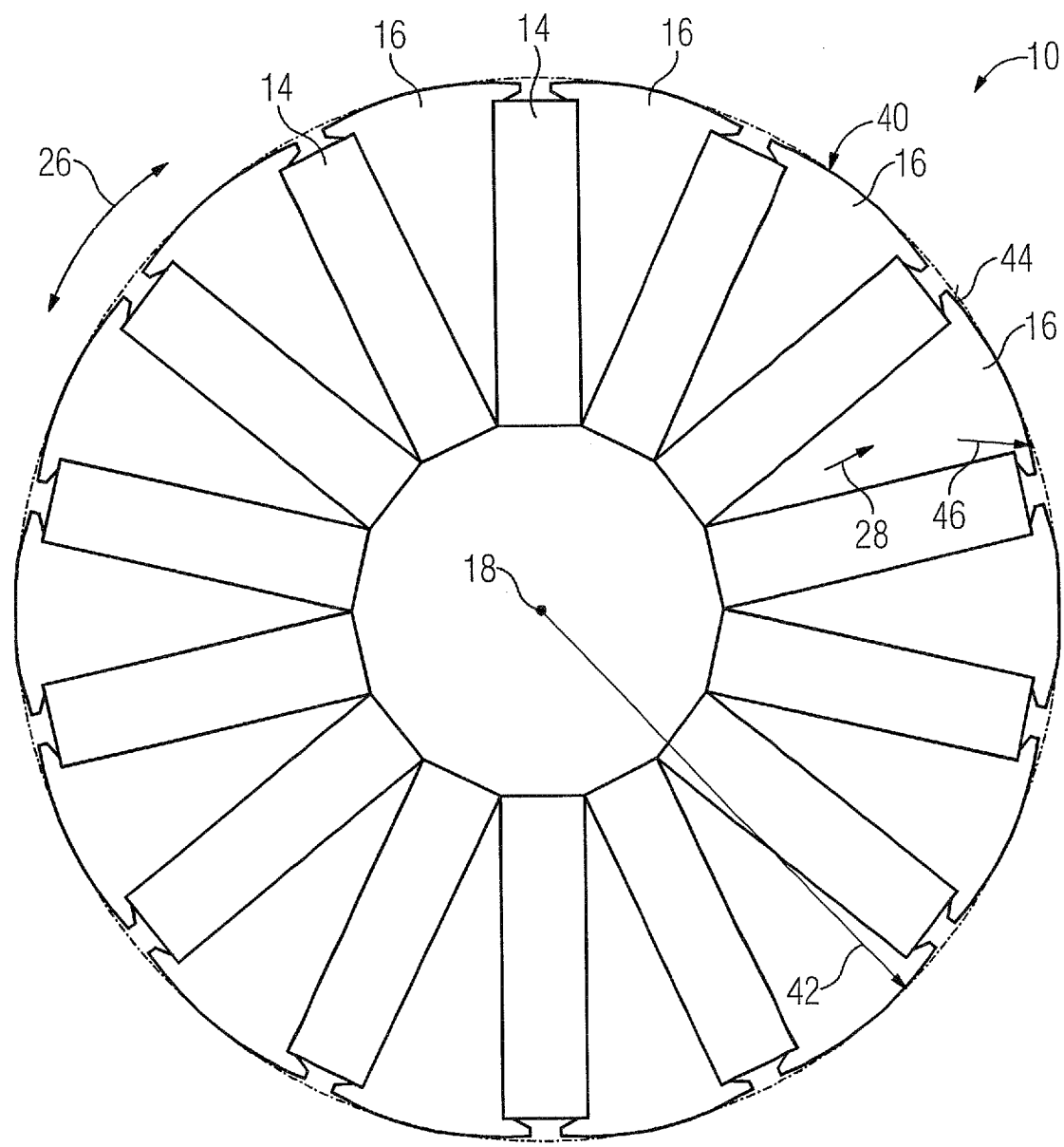
FIG. 3 is a schematic cross-sectional view of another embodiment of a rotor according to the invention.

Referring to FIG. 3, it is explained in the following how an external magnetic field can be generated by means of permanent magnets 14 in the case of a segmented rotor 10, said magnetic field having a maximally sinusoidal curve of the field strength along a circumferential direction 26. The rotor 10 shown in FIG. 3 can be for example the rotor of FIG. 1. For clarity of illustration reasons only a few permanent magnets 14 and flux conducting elements 16 are labeled with reference signs in FIG. 3. FIG. 3 again shows a section through a rotor 10 perpendicular to an axis of rotation 18. Also shown in FIG. 3 for greater clarity of illustration is an enveloping circle 40 which describes the maximum outer circumference of the rotor 10 starting from the axis of rotation 18. The enveloping circle 40 has an enveloping circle radius 42.

The individual flux conducting elements 16 have external surfaces 44 which are curved along the circumferential direction 26. By external surface 44 is meant in this context that surface of a flux conducting element 16 which limits the respective flux conducting element 16 in the radial direction 28. For clarity of illustration reasons corresponding components are labeled with a reference sign for one flux conducting element 16 only for the explanations in FIG. 3. In this case the external surfaces 44 of the flux conducting elements 16 each have a curvature radius 46 which is smaller than the enveloping circle radius 42.

Figure 4:
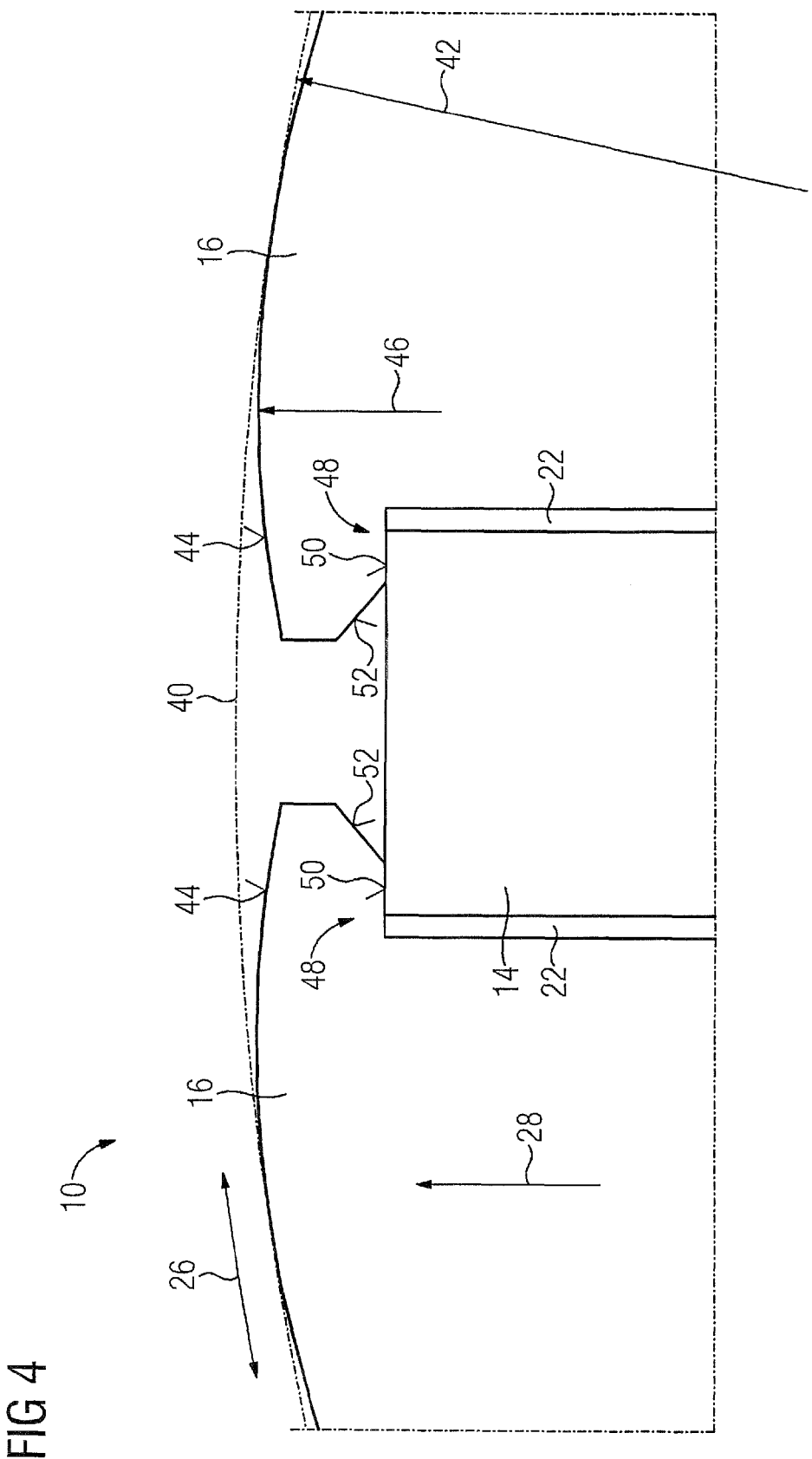
FIG. 4 is a schematic view of contact edges of permanent magnets which are covered by flux conducting elements in a rotor according to the invention.

In FIG. 4 it is shown how it can be achieved with the aid of undercuts or steps 48 that during gluing the flux conducting elements 16 are guided only precisely so far between the permanent magnets 14 to ensure that all the external surfaces 44 are tangentially touched by the enveloping circle 40. Toward that end the flux conducting elements 16 are inserted so far between the permanent magnets 14 until the steps 48 bear on contact edges 50 of the permanent magnets 14. By contact edge 50 of a permanent magnet 14 is meant in this context an edge of the permanent magnet 14 pointing toward an outside face of the rotor 10. Furthermore, by covering the contact edges 50 of the permanent magnet 14 by means of the steps 48 of the flux conducting elements 16, the curve of the field strength of the outer magnetic field of the rotor 10 is better adapted to the desired sinusoidal curve. Field peaks of the magnetic field exiting or entering the flux conducting elements 16 are additionally avoided by means of tapers in the region of the steps 48.

The examples shown furthermore have the advantage that the permanent magnets 14 and flux conducting elements 16 can be fixedly connected to the shaft in such a way that no additional external braces are necessary to stabilize the flux conducting elements 16 and the permanent magnets 14 against centrifugal forces.

It is shown overall by means of the examples how a combination of the bonding techniques of soldering and gluing can be used to enable a robust and at the same time easily realized manufacturing method for a permanent-magnet-excited rotor with internal magnet in flux concentration. The use of metallized ferrite magnets for soldering on a metallized shaft is also shown. Steps in flux conducting elements, such as laminated core segments for example, allow precise positioning of the individual flux conducting elements between the permanent magnets.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A rotor, comprising:
   a shaft having an axis of rotation;
   a plurality of permanent magnets arranged around the shaft in a circumferential direction for permanent excitation, at least one of the permanent magnets being attached to the shaft; and
   a flux conducting device for conducting a magnetic flux of the permanent magnets, said flux conducting device having a plurality of separate soft-magnetic flux conducting elements, with each flux conducting element being mounted between two of the permanent magnets and fixed thereto so as to be indirectly held in place on the shaft, at least one of the flux conducting elements having at least one radially outer contact area sized to cover an outer edge of one of the permanent magnets in the radial direction and narrows radially inwardly to a line extending in an axial direction to form a vertex where it contacts the shaft.

2. The rotor of claim 1, wherein the at least one of the permanent magnets is attached to the shaft by soldering or welding.

3. The rotor of claim 1, wherein the at least one of the permanent magnets is attached to the shaft by a material joint which is a soldered joint with a solder containing silver or tin.

4. The rotor of claim 1, wherein at least one of the permanent magnets has a metal coating in a contact area on the shaft.

5. The rotor of claim 4, wherein the coating includes nickel or copper.

6. The rotor of claim 1, wherein the shaft has an interior made of a first metal, said shaft having a coating made of a second metal in a contact area with at least one of the permanent magnets, with the second metal being different from the first metal.

7. The rotor of claim 6, wherein the coating includes nickel or copper.

8. The rotor of claim 1, wherein at least one of the permanent magnets has a contact area on the shaft, with the shaft having a flat surface in the contact area.

9. The rotor of claim 1, wherein at least one of the flux conducting elements is formed from a laminated core.

10. The rotor of claim 1, wherein at least one of the flux conducting elements is adhesively bonded to at least one permanent magnet.

11. The rotor of claim 10, wherein the adhesive bond includes a silicone glue.

12. The rotor of claim 1, wherein the rotor has perpendicular to its axis of rotation a cross-section in which the permanent magnets are arranged in a star shape on the shaft, and the flux conducting elements are arranged in a wedge shape between the permanent magnets.

13. The rotor of claim 1, wherein at least one of the permanent magnets has a magnetization pointing in the circumferential direction.

14. The rotor of claim 1, wherein two adjacent ones of the permanent magnets having magnetizations aligned in opposite directions to each other.

15. The rotor of claim 1, wherein at least one of the flux conducting elements has a surface which bounds the flux conducting element in the radial direction and has in the circumferential direction a curvature defined by a radius that is smaller than an enveloping circle radius of an enveloping circle which describes a maximum outer circumference of the rotor in the circumferential direction.

16. The rotor of claim 15, wherein the radius has a value in a range between 50 and 100 percent of a value of the enveloping circle radius.

17. A permanently excited electric machine, comprising a rotor including a shaft having an axis of rotation, a plurality of permanent magnets arranged around the shaft in a circumferential direction for permanent excitation, at least one of the permanent magnets being attached to the shaft, and a flux conducting device for conducting a magnetic flux of the permanent magnets, said flux conducting device having a plurality of separate soft-magnetic flux conducting elements, with each flux conducting element being mounted between two of the permanent magnets and fixed thereto so as to be indirectly held in place on the shaft, at least one of the flux conducting elements having at least one radially outer contact area sized to cover an outer edge of one of the permanent magnets in the radial direction and narrows radially inwardly to a line extending in an axial direction to form a vertex where it contacts the shaft.

18. The electric machine of claim 17, constructed in the form of a synchronous machine or as a servomotor or as a stepper motor.

19. A method for manufacturing a rotor, comprising:
   attaching permanent magnets to a shaft having an axis of rotation;
   inserting flux conducting elements in spaces between the permanent magnets such that external surfaces of all the flux conducting elements are tangentially touched by an enveloping circle and steps of the flux conducting elements radially outwardly bear on contact edges of the permanent magnets and, with the contact edge of each of the permanent magnets being formed by an edge of the permanent magnet pointing to an outside face of the rotor, with each of the flux conducting elements narrowing radially inwardly to a line extending in an axial direction to form a vertex where it contacts the shaft; and
   securing the flux conducting elements to the permanent magnets.

20. The method of 19, wherein the permanent magnets are secured by soldering or welding to the shaft.

* * * * *